May 4, 1948. H. M. PANCOAST 2,440,911
METHOD OF DISINFECTING AND PRECOOLING VEGETABLES
Filed Dec. 26, 1944 2 Sheets-Sheet 2
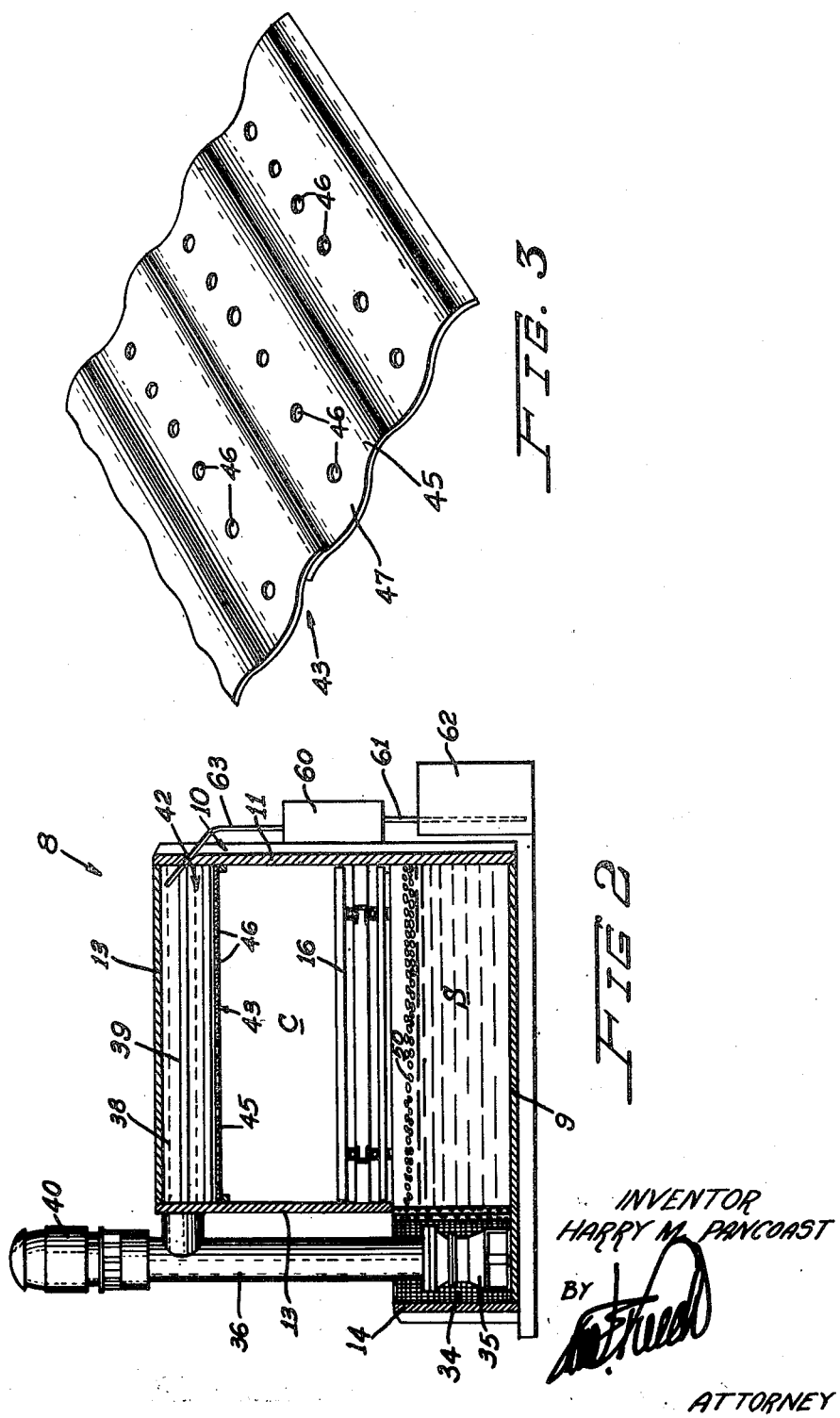

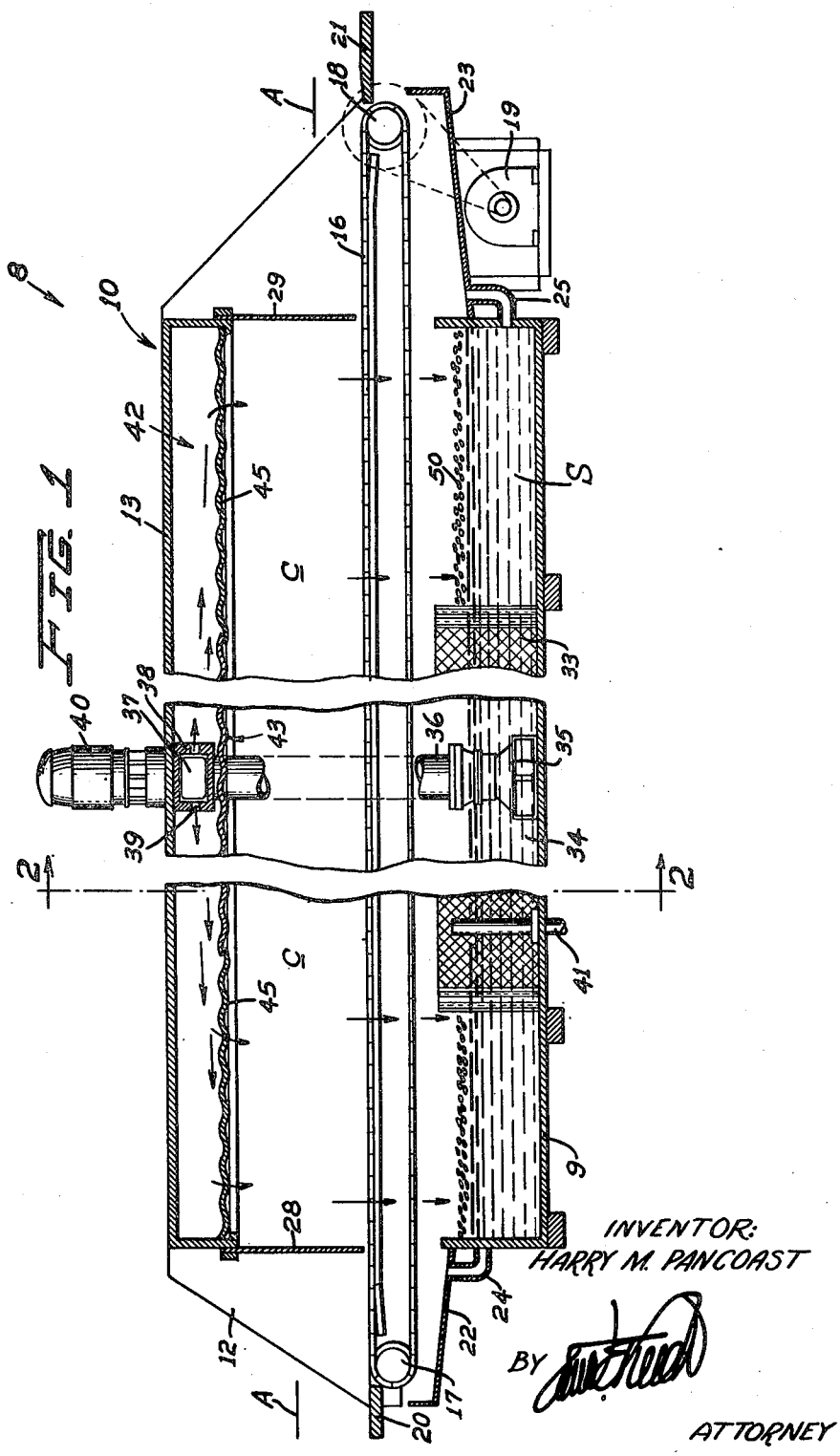

Patented May 4, 1948

2,440,911

UNITED STATES PATENT OFFICE 2,440,911

METHOD OF DISINFECTING AND PRE-COOLING VEGETABLES

Harry M. Pancoast, San Jose, Calif., assignor to Food Machinery Corporation, San Jose, Calif., a corporation of Delaware Application December 26, 1944, Serial No. 569,896

3 Claims. (Cl. 99—154)

This invention relates to the art of preserving the freshness of vegetables when the latter are merely cooled and then kept cool for considerable periods of time without freezing, as in long distance shipments in refrigerator cars.

It is common practise to precool vegetables to temperatures a few degrees above freezing, this generally being done after the vegetables are crated and before they are loaded into refrigerator cars for shipment. While this precooling contributes substantially to the freshness of the vegetables thus treated and shipped, considerable loss from the ravages of certain plant diseases have occurred in spite of such precooling.

For instance, fresh asparagus is subject to plant diseases known as "slime" and "tip decay," while shipments of fresh celery have suffered heavily from a form of decay known as "pink rot." Extensive efforts have been made to evolve a commercially practical process which would control these diseases. None of these efforts has been successful.

It is an object of this invention to provide such a method for the treatment of fresh vegetables which will not only adequately precool the latter, but which will accomplish a substantial degree of control of the plant diseases aforesaid.

It is a further object of the invention to provide a process for controlling the aforesaid plant diseases which may be performed with very little cost in addition to that formerly necessary incidental to the precooling of fresh vegetables in preparing these for shipment.

Yet another object of the invention is to provide a process for the controlling of said plant diseases in fresh vegetables which will utilize for its purposes the same equipment formerly exclusively devoted to precooling said vegetables and will require very little equipment in addition thereto.

The manner of accomplishing the foregoing objects, as well as further objects and advantages, will be made manifest in the following description taken in connection with the accompanying drawings, in which:

Fig. 1 is a longitudinal vertical sectional view of an apparatus suitable for use in performing the method of my invention.

Fig. 2 is a transverse sectional view taken on the line 2—2 of Fig. 1.

Fig. 3 is a fragmentary perspective view illustrating a preferred form of liquid distributing tank bottom employed in the aforesaid apparatus.

Referring specifically to the drawings a preferred form of apparatus for practicing my invention is designated therein by the numeral 8. This apparatus includes a tank 9 which also provides a supporting frame for the remaining structure, and above which a box-like enclosure 10 is formed by sidewalls 11, 12 and top wall 13. Preferably, the sidewall 11 forms an upward continuation of the sidewall of the tank 9, while the wall 12 is spaced inwardly from the other sidewall of the tank to provide a projecting tank portion 14. The tank 9 is supplied with an aqueous solution S of sodium hypochlorite. The apparatus 8 also includes a slatted conveyor 16, which is supported at its feed end by idler sprocket 17, and at its discharge end by drive sprockets 18. The sprockets 18 are driven from a motor 19.

Supported at their opposite ends by the sidewalls 11 and 12 are delivery and discharge boards 20 and 21. Also supported by adjacent ends of the sidewalls 11 and 12 at opposite ends of the apparatus 8 are drain pans 22 and 23, which are connected by drain pipes 24 and 25 to the tank 9. The conveyor 16 is driven in the direction of the arrows A in Fig. 1, so that product delivered thereto over delivery board 20, either in crates or in bulk, will travel into and through a disinfecting and precooling chamber C, formed by the enclosure 10, and be discharged from the conveyor over the board 21. Opposite ends of the chamber C are closed by flexible strip curtains 28 and 29 which yield when contacted by the product to allow the latter to pass by these curtains.

The tank portion 14 which projects laterally beyond the sidewall 12 (see Fig. 2) is provided with a screen 33, which surrounds a pump intake compartment 34. Disposed in this compartment is a turbine pump 35 mounted on the lower end of a standpipe 36, through which solution S is adapted to be pumped upwardly by the pump 35 and discharged through a mouth 37 into a transversely disposed distributing box 38, having side slots 39 formed therein. Pump 35 is driven through a line shaft by an electric motor 40, mounted on the upper end of the standpipe 36. Extending upwardly through the bottom of the tank 10, within the screened pump intake compartment 34, is an overflow pipe 41.

Supported in the box-like enclosure 10 to form a solution distributing tank 42 is a distributing floor 43 which also comprises a ceiling for chamber C. The floor ceiling 43 is formed by a series of foraminous transversely corrugated metal plates 45, adjacent edges of which overlap each other. This floor-ceiling 43 is disposed just beneath the solution distribution box 38, and is adapted to receive solution discharged by this box through the slots 39, and permit this solution to flood downwardly in streams pouring through holes 46 provided in the valleys 47 between adjacent corrugations of the plates 45. (See Fig. 3.)

Provided on the sidewall 11 is a chemical pump unit 60 which sucks concentrate through a pipe 61 from drum 62 standing on the floor beside the tank 9 and injects this concentrate in regulated amounts through a pipe 63 into the distributing box 38, where this concentrate is mixed with the solution S flowing therethrough.

The chemical pump 60 is diagrammatically shown in the drawings and may comprise any suitable small chemical pump which includes means for regulating its operation to determine the rate at which concentrate is pumped from the drum 62 into the solution distributing box 38.

*Operation*

The manner of operating the apparatus 8 in order to perform the method of my invention will now be described.

Before starting the method and while it is being performed, some means must be provided for cooling the sodium hypochlorite solution S. This is preferably done by introducing cracked ice, sometimes known commercially as "snow-ice," into the projecting tank portion 14 at opposite ends of the screened pump intake compartment 34. This ice is preferably introduced in such quantities so as to maintain, throughout the operation of the apparatus 8, a substantial layer or stratum 50 of cracked ice particles which covers the surface of the solution S in the tank 9.

The layer of cracked ice 50 cools the body of hypochlorite solution S, and also cools any solution draining downwardly into the tank 9 from above the ice during the operation of the apparatus 8 in performing my invention.

When the solution S is thoroughly cooled (it is preferable that this be brought down to a temperature of about 34° F.), the apparatus 8 is ready for operation. The motors 19 and 40 are now energized to start the conveyor 16 moving and operate the pump 35 which sucks in the coldest solution S adjacent the bottom of tank 9, and discharges this into the distributing box 38, so that it gushes forth from slots 39 on opposite sides thereof in sufficient quantity to keep the corrugated chamber ceiling 43 covered with cold solution. The product, either in bulk or in crates, is then placed on the receiving end of the conveyor 16 which carries it in the direction of the arrows A through the curtain 28 and into the disinfecting and precooling chamber C. The conveyor 16 is practically covered with the product during the operation of my method, and the solution pouring downwardly through all of the holes 46 in the ceiling 43 deluges the product on the conveyor 16 from the time it enters the chamber C until it leaves this.

The speed of the conveyor 16 can be regulated by changing the sprocket size on motor 19. A variation in conveyor speed is desirable in order to obtain maximum sterilizing and cooling effect upon the various commodities. Some products, such as asparagus, having relatively small diameters can be more quickly cooled than other commodities, such as cauliflower, which have a greater distance between the exterior of the product and its center. In addition to the size of the product, its temperature prior to cooling will determine the time required for adequate temperature reduction. This cooling period can be varied by changing the speed of the conveyor 16. This cooling period will thus vary from five to forty-five minutes.

In the treatment of vegetables generally with my process I have found that the solution S performs its disinfecting action satisfactorily on most of the commodities suitable for sterilizing and precooling before shipment, where the solution contains sodium hypochlorite in a concentration of from 100 to 150 parts per million of available chlorine. Where a relatively long treatment becomes practically necessary for cooling purposes, I find the desired disinfecting action of my process may be obtained by as small a concentration as 25 parts per million of available chlorine. Where the cooling treatment may be accomplished in a very short length of time I may find it desirable to increase the concentration of hypochlorite to as much as 500 parts per million of available chlorine.

An amount of water is constantly being added to the solution S by the melting of the ice 50 which is in excess of the amount of solution which is removed by the product and crates as they leave the disinfecting and precooling chamber C. The water produced by the melting ice, of course, dilutes the solution S, and this makes it necessary to constantly add sodium hypochlorite to the solution S.

The concentration of sodium hypochlorite is maintained at the desired levels in the solution S by the continuous addition of a concentrated solution of sodium hypochlorite. The addition of about one gallon per hour of a solution of sodium hypochlorite containing approximately 20% available chlorine will maintain the concentration at the level of from 100 to 150 parts per million of available chlorine when the total volume of solution S is about 2000 gallons and ice meltage is such as to reduce the temperature of about 15 tons of the product from about 80° F. to about 35° F. The addition of concentrate is accomplished by the chemical pump unit 60.

In order to get a desired degree of activity by the sodium hypochlorite in the solution S at the low temperatures at which my process operates, I find it desirable to buffer the pH of the solution S down below 8.5 and preferably between 7.8 and 8.2

Under normal conditions I find an adequate disinfecting and precooling treatment may be accomplished on asparagus, celery, Brussels sprouts and unhusked corn within five to twenty-five minutes, whereas under adverse circumstances this may require a longer period of time to obtain adequate heat removal and disinfection.

While a number of different buffers are available for use in lowering the pH of solution S as above described, I prefer to use sodium acid citrate, which is entirely non-toxic.

I have observed that the effectiveness of the sodium hypochlorite treatment in performing the disinfecting action of my method is increased by the addition to the solution S of a small amount of a surface active agent. It is necessary to use surface active agents which are non-toxic in the concentrations to be used. Concentrations to be used can vary from twenty parts per million to five hundred parts per million (.002%–.05%).

Among those agents which are suitable for this purpose are:

Fatty acid partial esters of hexitol anhydrides
Polyoxyalkylene derivatives of fatty acid partial esters of hexitol anhydrides
Sulfated secondary alcohols
Sulfonated esters of alcohols and dibasic acids
Sulfonated alkyl aryl compounds It is understood that other surface active agents may also be used for this purpose, the examples above listed being illustrative.

As described above the agent preferably used in the process of my invention is sodium hypochlorite. It should be understood, however, that potassium hypochlorite, though more expensive and thus not at present competitive commercially with sodium hypochlorite, is the functional equivalent thereof. It is also possible to employ with my process on certain vegetables and with some measure of efficiency other hypochlorites, such as calcium hypochlorite. Broadly speaking, therefore, the process of my invention may be performed with any hypochlorite of an alkali forming metal, by which term I mean those metals (like sodium and calcium) the oxides and hydroxides of which are commonly referred to as "alkalies."

Ordinarily the disinfecting of fresh vegetables and the like requires an apparatus especially provided just for applying the disinfecting agent. One of the advantages of the method of my invention is that the need for such a special apparatus is dispensed with and the disinfecting treatment is performed incidental to and by the same liquid vehicle employed in precooling the vegetables. This results in large savings both in cost of equipment and in expense of operation in commercially disinfecting and precooling fresh vegetables and the like.

While I have confined the disclosure of my invention to certain preferred examples of its application commercially, it is to be understood that the invention is not limited to the examples disclosed and that various modifications may be made in these without departing from the spirit of the invention or the scope of the appended claims.

The chemical pump unit 60 preferably is of the dual type, a suitable example of which is shown in United States Letters Patent to Donald L. Mapson #2,332,157 issued October 19, 1943. This pump has separate rubber pumping tubes through which separate solutions can be pumped by peristalsis. Only one of these tubes is utilized for the feeding of hypochlorite concentrate into the solution S, and the other tube is employed to pump a concentrated solution of the buffer and the surface active agent into the solution S in the distributing box 38.

Thus by the operation of a single pump unit 60 the desired strength of hypochlorite and buffer and surface active agent can be maintained in the solution S throughout the treatment of vegetables in the apparatus 8.

I claim:

1. The method of treating vegetables to aid in preserving them in their natural fresh condition which comprises conveying the product through a disinfecting and cooling liquid in spaced relation to and beneath said zone, and having a surface area substantially coextensive with the horizontal sectional area of said zone, and disposed to receive liquid from said zone, said liquid comprising an aqueous solution of a hypochlorite of an alkali forming metal, buffering said solution to maintain the pH thereof substantially within the range of 7–8.5, providing an agglomeration of small pieces of ice floating at the upper surface of, and in a stratum substantially entirely covering said body of liquid, withdrawing liquid from beneath said stratum of ice and discharging the same and distributing it throughout a zone above and coextensive with the cooling zone to cause it to fall onto said product and drop therefrom back into said body of liquid through said stratum of ice.

2. The method of treating vegetables to aid in preserving them in their natural fresh condition which comprises conveying the product through a disinfecting and cooling zone, establishing and maintaining a body of disinfecting and cooling liquid in spaced relation to and beneath said zone, and having a surface area substantially coextensive with the horizontal sectional area of said zone, and disposed to receive liquid from said zone, said liquid comprising an aqueous solution of a hypochlorite of an alkali forming metal within a range of 25 to 500 parts per million of available chlorine, buffering said solution to maintain the pH thereof substantially within the range of 7–8.5, providing an agglomeration of small pieces of ice floating at the upper surface of, and in a stratum substantially entirely covering said body of liquid, withdrawing liquid from beneath said stratum of ice and discharging the same and distributing it throughout a zone above and coextensive with the cooling zone to cause it to fall onto said product and drop back into said body of liquid through said stratum of ice.

3. The method of treating vegetables to aid in preserving them in their natural fresh condition which comprises conveying the product through a disinfecting and cooling zone, establishing and maintaining a body of an aqueous solution of a hypochlorite of an alkali forming metal, withdrawing solution from said body, and distributing the withdrawn solution above the conveyed product over an area substantially coextensive with the horizontal section of the cooling zone to cause said distributed solution to fall onto said product as the latter is being conveyed through said zone, returning to said body the portions of said solution draining downwardly from said product, constantly cooling said solution so as to maintain below 40° F. the temperature of the solution delivered downwardly onto the product, and buffering said solution to maintain the pH thereof within the range of 7–8.5.

4. The method of treating vegetables to aid in preserving them in their natural fresh condition, which comprises: providing a body of an aqueous solution of a hypochlorite of an alkali forming metal, circulating said solution so as to flood said product for a period varying from five to forty five minutes depending upon the initial temperature of the product and the accessibility of said product to penetration of said solution into intimate contact therewith, constantly returning to said body of solution the portion of said solution draining from said product, constantly cooling said solution at some point in its circulation so that the temperature of the solution where it is flooded over the product is substantially below 40° F., and buffering the pH of said solution to maintain the same within the range of 7–8.5.

5. The method of treating vegetables to aid in preserving them in their natural fresh condition which comprises providing a liquid body of an aqueous solution of a hypochlorite of an alkali forming metal, constantly cooling said solution so as to maintain the temperature thereof below 40° F., buffering said solution to maintain the pH thereof to below 8.5, and contacting said product intimately with said solution while so cooled for a sufficient period to produce a substantial reduction in the temperature of the product and disinfect the same.

6. The method of treating vegetables to aid in preserving them in their natural fresh condition which comprises providing a liquid body of an aqueous solution of a hypochlorite of an alkali forming metal, constantly cooling said solution with ice placed therein so as to maintain the temperature thereof below 40° F., buffering said solution to maintain the pH thereof within the range of 7-8.5, contacting said product intimately with said solution for a sufficient period to produce a substantial reduction in the temperature of the product and disinfect the same, and adding regulated amounts of a concentrate of said hypochlorite and buffer to said solution during said treatment to compensate for dilution of said solution by said ice.

7. The method of treating vegetables to aid in preserving them in their natural fresh condition which comprises providing a liquid body of an aqueous solution of a hypochlorite of an alkali forming metal, within a range of 25 to 500 parts per million of available chlorine, constantly cooling said solution with ice placed therein so as to maintain the temperature thereof below 40° F., buffering said solution to maintain the pH thereof within the range of 7-8.5, contacting said product intimately with said solution for a period of from five to forty five minutes, and adding regulated amounts of a concentrate of said hypochlorite and buffer to said solution during said treatment to compensate for dilution of said solution by said ice.

8. The method of treating fresh vegetables to simultaneously precool and sterilize them, comprising the step of chilling said vegetables by intimately contacting them with a refrigerated aqueous solution of a hypochlorite of an alkali forming metal containing not more than about 500 parts per million of available chlorine, said solution having a temperature below 40° F. and being buffered to maintain a pH value of below 8.5.

HARRY M. PANCOAST.

REFERENCES CITED

The following references are of record in the file of this patent:

UNITED STATES PATENTS

| Number | Name | Date |
|---|---|---|
| 1,548,077 | Wallis | Aug. 4, 1925 |
| 1,550,946 | Braungart et al. | Aug. 25, 1925 |
| 1,681,009 | Peterson | Aug. 14, 1928 |
| 1,708,253 | Bell et al. | Apr. 9, 1929 |
| 2,210,133 | Sharma | Aug. 6, 1940 |
| 2,256,745 | Magnuson | Sept. 23, 1941 |